United States Patent
Boni et al.

(10) Patent No.: US 10,342,381 B2
(45) Date of Patent: Jul. 9, 2019

(54) ENERGY SAVING COFFEE MACHINE (71) Applicant: REDOX S.R.L., Reggio Emilia (IT)

(72) Inventors: Angelo Boni, Reggio Emilia (IT); Marco Mazzali, Rio Saliceto (IT)

(73) Assignee: ILLYCAFFE' S.P.A., Trieste (IT)

( * ) Notice: Subject to any disclaimer, the term of this patent is extended or adjusted under 35 U.S.C. 154(b) by 384 days.

(21) Appl. No.: 14/362,731

(22) PCT Filed: Dec. 6, 2012

(86) PCT No.: PCT/IB2012/057018
§ 371 (c)(1),
(2) Date: Jun. 4, 2014

(87) PCT Pub. No.: WO2013/084180
PCT Pub. Date: Jun. 13, 2013

(65) Prior Publication Data
US 2014/0352543 A1 Dec. 4, 2014

(30) Foreign Application Priority Data
Dec. 7, 2011 (IT) .............................. RE2011A0109

(51) Int. Cl.
*A47J 31/56* (2006.01)
*A47J 31/54* (2006.01)

(52) U.S. Cl.
CPC ............. *A47J 31/56* (2013.01); *A47J 31/542* (2013.01); *A47J 31/545* (2013.01)

(58) Field of Classification Search
CPC ......... A47J 31/56; A47J 31/542; A47J 31/545
(Continued)

(56) References Cited

U.S. PATENT DOCUMENTS 3,826,887 A * 7/1974 Pemberton ............... G05B 6/02
219/497
5,193,139 A * 3/1993 Schiettecatte ......... A47J 31/545
392/480
(Continued)

FOREIGN PATENT DOCUMENTS

| CN | 1135095 A | 2/1999 |
| CN | 101493707 A | 7/2009 |

(Continued)

*Primary Examiner* — Ibrahime A Abraham
*Assistant Examiner* — Biniam B Asmelash
(74) *Attorney, Agent, or Firm* — Pearne & Gordon LLP (57) ABSTRACT

Automatic coffee machines have very low thermal efficiency because they have to heat a considerable thermal mass, constituted by the heater 3) appearing in FIG. 1, which has a weight generally ranging between 0.5 and 1 Kg of metal, typically consisting of aluminum. Said mass is used to stabilize the temperature of the water to be injected in the blend of coffee. In this configuration, 90% or more of the thermal energy is wasted. The energy saving coffee machine, the subject matter of the present invention, is instead constructed with a heater 3), appearing in FIG. 4, that has a thermal mass much lower than the mass of the liquid to be heated, and is typically constructed with metal tube 30), as shown in FIG. 4, weighing a few grams. The heating current 41) in FIG. 4 flows directly on said tube, heating it together with the water contained therein, while a very rapid temperature control circuit makes it possible to maintain a constant temperature of the water flowing through the heater 3) shown in FIG. 4. Temperature measurement is carried out by monitoring the resistance of the tube 30) shown in FIG. 4, at the times in which the heating current 41) is not passing through the latter. In this manner, high energy efficiency is obtained, in that the dispensing of the coffee begins immediately upon pressing the start push button 48) and the (Continued)

machine is kept completely switched off between the dispensing of one cup of coffee and the next.

14 Claims, 9 Drawing Sheets (58) Field of Classification Search
USPC ........... 99/281; 219/494, 497; 392/396, 397, 392/402
See application file for complete search history.

(56) References Cited

U.S. PATENT DOCUMENTS

| | | | | |
|---|---|---|---|---|
| 5,402,705 | A * | 4/1995 | Bailleux | A47J 31/545 392/480 |
| 5,455,887 | A | 10/1995 | Dam | |
| 5,479,558 | A * | 12/1995 | White, Jr. | F24H 9/2028 219/497 |
| 5,504,306 | A * | 4/1996 | Russell | F24H 9/2028 219/481 |
| 5,549,035 | A | 8/1996 | Wing-Chung | |
| 5,702,624 | A * | 12/1997 | Liao | G05D 23/1917 219/444.1 |
| 5,992,298 | A * | 11/1999 | Illy | A47J 31/36 99/281 |
| 6,442,341 | B1 | 8/2002 | Wu | |
| 6,459,854 | B1 | 10/2002 | Yoakim et al. | |
| 6,661,968 | B2 | 12/2003 | Beaulieu | |
| 6,806,446 | B1 * | 10/2004 | Neale | F24H 9/2028 219/485 |
| 8,600,223 | B2 | 12/2013 | Etter et al. | |
| 9,398,829 | B2 | 7/2016 | Etter et al. | |
| 2002/0141742 | A1 | 10/2002 | Beaulieu | |
| 2003/0168442 | A1 * | 9/2003 | Porter | H01L 21/67248 219/494 |
| 2008/0264264 | A1 * | 10/2008 | Morgandi | A47J 31/56 99/281 |
| 2009/0223947 | A1 * | 9/2009 | Mou | C04B 33/04 219/539 |
| 2010/0046934 | A1 * | 2/2010 | Johnson | F24H 1/121 392/480 |
| 2010/0111508 | A1 * | 5/2010 | Ding | F24D 3/08 392/308 |
| 2010/0221394 | A1 * | 9/2010 | Gaulard | F24H 1/162 426/231 |
| 2010/0282090 | A1 * | 11/2010 | Etter | A47J 31/542 99/288 |
| 2011/0135289 | A1 * | 6/2011 | Kayser | F24D 17/0031 392/449 |
| 2013/0055902 | A1 * | 3/2013 | Berto | A47J 31/542 99/281 |
| 2014/0053733 | A1 | 2/2014 | Etter et al. | |
| 2015/0216355 | A1 * | 8/2015 | Duvall | A47J 31/56 99/282 |

FOREIGN PATENT DOCUMENTS

| | | | | |
|---|---|---|---|---|
| CN | 201340063 | Y | 11/2009 | |
| CN | 101883510 | A | 11/2010 | |
| EP | 0451672 | A1 | 10/1991 | |
| EP | 2208451 | A1 | 7/2010 | |
| FR | 2895066 | A1 | 6/2007 | |
| GB | 2154402 | A * | 9/1985 | ............ H05B 6/108 |
| JP | S55141011 | U | 10/1980 | |
| JP | S60-12689 | A | 1/1985 | |
| JP | S6073433 | A | 4/1985 | |
| JP | 2000241022 | A | 9/2000 | |
| JP | 2000241023 | A | 9/2000 | |
| JP | 2000515031 | A | 11/2000 | |
| JP | 2003-512878 | A | 4/2003 | |
| JP | 2003521802 | A | 7/2003 | |
| WO | 9724052 | A1 | 7/1997 | |

* cited by examiner

ENERGY SAVING COFFEE MACHINE

There are millions of machines for automatically producing espresso coffee, set up in homes, offices, fitness centres, schools and industries, The energy consumption of these machines is not optimised, and the energy actually utilised to make the coffee is a very small fraction of the total absorbed power. On the one hand, we are witnessing a marked waste of energy, considering the very high number of machines existing worldwide, and on the other hand, we are unable to obtain coffee where the availability of electric power is limited (for example, in an automobile or outdoors). The aim of the present invention is to realise a coffee machine with high energy efficiency, capable of making coffee even in situations where the electric power supply network is not available, by connecting alternatively to a battery self-contained in the appliance or available in the means of transport on which it is installed (e.g. the automobile battery).

STATE OF THE ART

Figure 1:
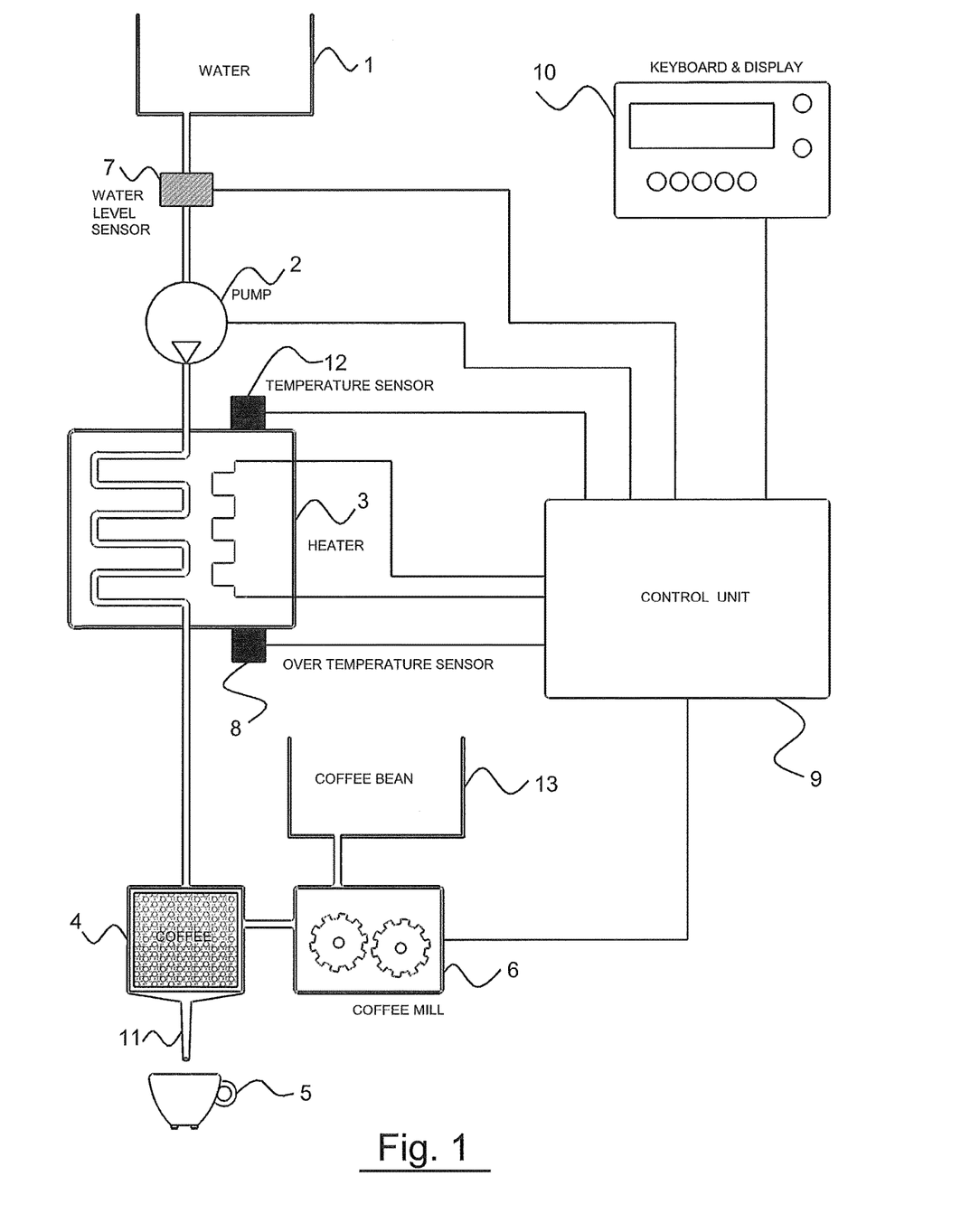
FIG. 1 is a schematic view of a coffee machine that is currently known and available on the market.

Machines for producing espresso coffee in the home or office sizes, as indicated in FIG. 1, are made up of at least a water tank (1), a pump (2) for delivering water to the heater (3) and to a blend of coffee housed in the container (4), which, through the spout (11), conveys the coffee into the cup (5).

The water must be heated to about 90° C. before being put into contact with the coffee blend, in such a manner as to extract a maximum amount of aromas and essences of the blend. The temperature sensor (12) is used in order to stabilise the temperature of the heater at the required temperature. The machines may further comprise a coffee mill (6) connected to a coffee dispenser (13). As an alternative, grinding can take place outside the machine, or even pods or capsules filled with a blend of coffee and available in a variety of types on the market, can be used. A control unit (9) and a keyboard display (10) allow for managing the operating functions of the machine, including the amount and type of coffee to be made, checking the operating functions (presence of water, presence of coffee, machine ready for dispensing coffee and so forth). In addition, a set of auxiliary and safety devices are included, such as the water level sensor (7), and the over temperature thermostat (8).

Figure 2:
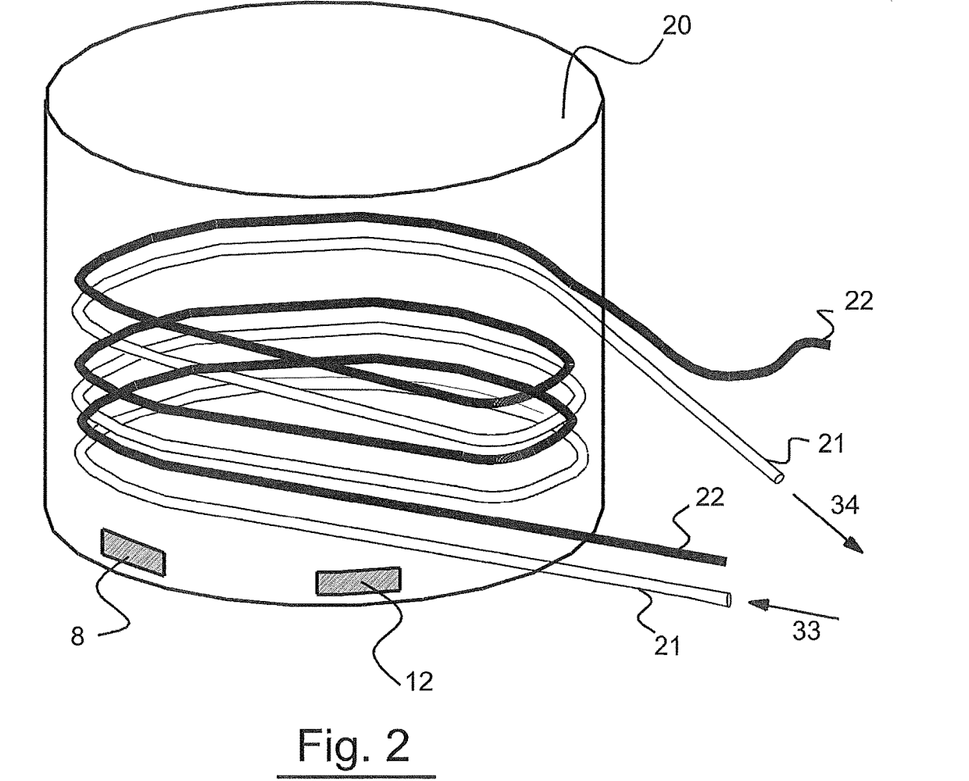
FIG. 2 is a schematic view of a heater of a known type.

A crucial component in the currently available machines is the heater (3) for heating the water, because it is the component that uses the greatest amount of energy. FIG. 2 is a more detailed drawing of the heater in the typical embodiment: the tube that transports the water (21) is incorporated, together with the electrical heating resistor (22), in a metal block (20), typically made of aluminium. The cold water (33) enters from one end of the tube (21) and comes out heated at the opposite end (34). The current is applied to the electrical resistor (22) to heat the heater. There are two thermostats, one for regulating (12) set at 85-90° C., which keeps the water at the set temperature, periodically supplying power to the heating resistor (22), and a second safety thermostat (8), set at a higher temperature, capable of intervening so as to deactivate the heating resistor (22) should the thermostat (12) or the control system malfunction.

The operation of the heater is the following: the resistor (22) is fed until the entire block (resistor, water tube and thermostats) reaches a temperature of about 90° C. At this point the resistor (22) is disconnected by the control system and is not reconnected until the temperature has dropped for example to 85° C. The power of the heating element varies between 1200 and 2200 Watts (1500 W being the most common value), whereas the supply voltage ranges between 110 V and 230 V, depending upon the country of operation. The thermal time constants are rather long and the heating time (with the machine cold) varies between 2 and 5 minutes, whereas the on/off cycle of the resistor (22) under operating conditions is on the order of several seconds.

Energy Used to Make a Cup of Coffee:

A cup of espresso coffee has a typical volume of 25 CC. The water is heated from a room temperature of 20° C. to about 90° C. in order to have the coffee at about 85° C. To raise the temperature of 1 cc of water by 1° C., 1 calorie is required, corresponding to 4.18 J. The energy utilised in Joules is thus the product of the quantity of water (25 CC) multiplied by the delta temperature (from 20 to 90° C.), that is, 70° C., and multiplied by the specific heat of the water. Therefore 25×70×4.18=7.315 J are required to make one cup of coffee, and considering the energy also used by the auxiliary control circuits and the pump, an actual amount of about 8000 Joules can be calculated.

Power Absorbed by the Coffee Machine:

We can identify two different operating modes of the machine. The first operating mode is typical household use, in which the machine is turned on each time a cup of coffee is prepared. The second operating mode is typical office use, in which the machine remains turned on continuously for about 10 hours per day and dispenses, for example, 30 cups of coffee. If we assume a heater power of 1500 W, a heating time of 2 minutes, and consumption of 50 W with the machine on (the on time of the resistor is 1/30 of the total), the result is that:

In the first operating mode, the absorbed power is 1500 W for 2 minutes, or in J (1 Joule=1 W×1 second), and we have 1500 W×120 sec.=180,000 J. Considering the energy needed for the preparation of a cup of coffee, with respect to the energy consumed overall by the machine, the result is (8000/180,000)×100=4.44%, that is, only 4.44% of the energy utilised has been used to make the coffee.

In the second operating mode, the machine operates for 10 hours at 50 W on average, that is, 500 W, corresponding to 1,800,000 J, to which 180,000 J (previous case) for the start-up should be added. In ten hours of operation, the machine thus consumes approximately 1,980,000 J, which divided by 30 cups of coffee, correspond to 66,000 J per cup. In this second operating mode, the ratio between the energy needed for the preparation of a cup of coffee and total energy approximately consumed by the machine for a cup of coffee proves to be 8000/66000×100=12.12%. It is therefore clear that the energy yield of a coffee machine is extremely low.

The aim of the present invention is to bring the yield of a coffee machine to 90% and beyond, opening the way to embodiment possibilities that could not have been taken into consideration in the past owing to the high consumption levels thereof.

The characteristics and advantages of the present invention will become more apparent from the detailed description herein below of an embodiment of the invention at hand, illustrated by way of non-limiting example in the accompanying drawings, wherein.

REALISATION OF THE INVENTION

To achieve a very high energy yield, the concept of the heater for heating the water needs to be changed completely. As mentioned above, a heater for a coffee machine is currently constituted by a metal mass ranging between 0.5 and 1 Kg in weight, in which the water tube and the resistor are embedded. This construction typology makes regulation of the water temperature simple, in that the strong thermal mass of the assembly becomes a stabilising element of the temperature, which can be easily controlled by an ON/OFF thermostat operating with a cycle of several seconds.

In the present invention, the heater (FIG. 3) is reduced to a tube (30) weighing a few grams, which has virtually no thermal inertia and must therefore be regulated to the temperature by a sophisticated electronic system that regulates the temperature proportionally and with extreme rapidity, based on the flow of water passing through the tube.

The advantages of the invention are immediately evident: being extremely reduced in mass, the heater heats up immediately, avoiding the need to maintain the temperature thereof constantly. In this manner, the heater is turned on the instant in which the coffee must be prepared and is turned off at the end of preparation. Consumption with the machine stand by is thus null, whereas in the preceding example, it is about 50 W. Energy consumption for heating the tube (30) is also very low, considering that the mass of the heater is only a few grams. By way of example, let us consider a heater having a mass of 5 grams that has to be brought from 20 to 90° C.:

5 (mass of heater in grams)×70 (temperature interval)×0.4 (mean specific heat of the metal)=140 J. Approximately 8000 J are needed to make a cup of coffee, and as a result the energy utilised to obtain a cup of coffee thus proves to be 98.25% of the total energy utilised. Considering the energy also needed by the auxiliary circuits and losses, a yield of the machine amounting to over 90% thus appears, in any case, to be a concrete consideration.

The coffee machine according to the present invention thus comprises a heater (3), comprising a tube (30) predisposed for being heated for the purpose of increasing the temperature of a flow of water between an inlet (33) and an outlet (34). Different embodiments of the heater (3), in various typical, but not exclusive, types of construction appear in FIGS. 3a, 3b, 3c, and 3d. The heater (3) is indicated as rectilinear, however, it may obviously take on curvilinear, spiral, helicoid or other complex shapes according to the construction requirements of the complete machine.

The machine further comprises heating means (R) that utilises an electric current to produce heat and to heat the tube (30). The heating means (R) is preferably of a resistive type, that is, it produces heat by Joule effect.

The machine further comprises at least one temperature sensor (S), structured in such a manner as to be substantially at the same temperature of the tube (30) and to vary in resistance based on its own temperature. Given the extremely limited mass of the tube (3), the response of the temperature sensor to variations in temperature must be extremely rapid and precise so as to permit efficient control of the water temperature.

In a first embodiment of the machine (FIG. 3A), the heating means (R) comprises the tube (30), made of conductive metal material and arranged for having an electric current pass through it between the two ends (31) thereof, so as to heat up and heat the flow of water as well. The temperature sensor (S) also comprises the metal tube (30). The water enters inside the tube (30) at an inlet section (33) and leaves the tube (30) at an outlet section (34), heating up by means of a very efficient heat exchange with the tube (30), owing to the high ratio between the length and the diameter of the tube (30). As the variation of electrical resistance of the tube (30) is based on the temperature, by monitoring the value of said resistance it is possible to obtain the precise temperature of the tube and thus of the water. As the electrical resistance of the tube (30) is low (typically fractions of an Ohm), it is particularly suited to battery or low voltage applications.

Figure 3A:
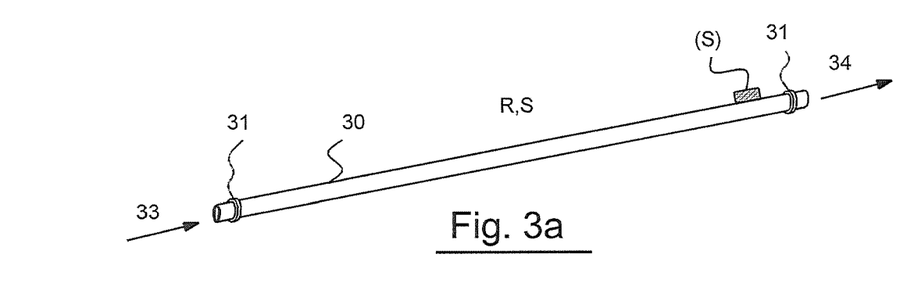
FIGS. 3A, 3B, 3C, and 3D show different embodiments of a heater for the machine according to the present invention.
Figure 3B:
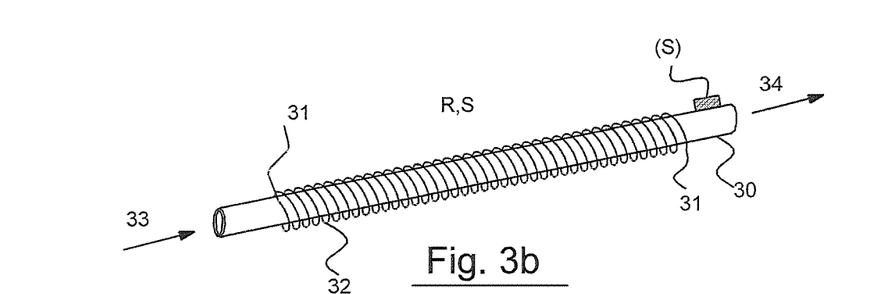
Figure 3C:
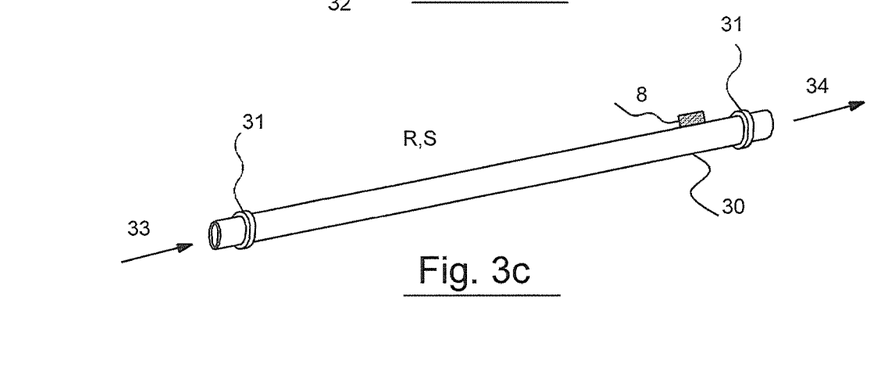
Figure 3D:
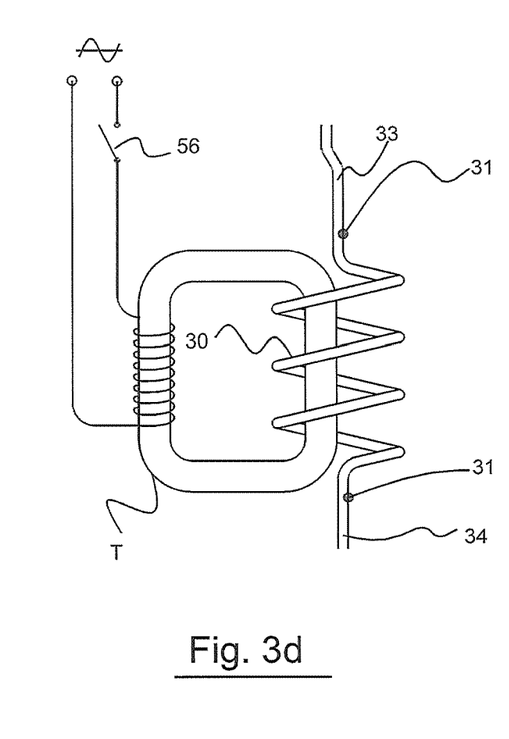
Figure 4:
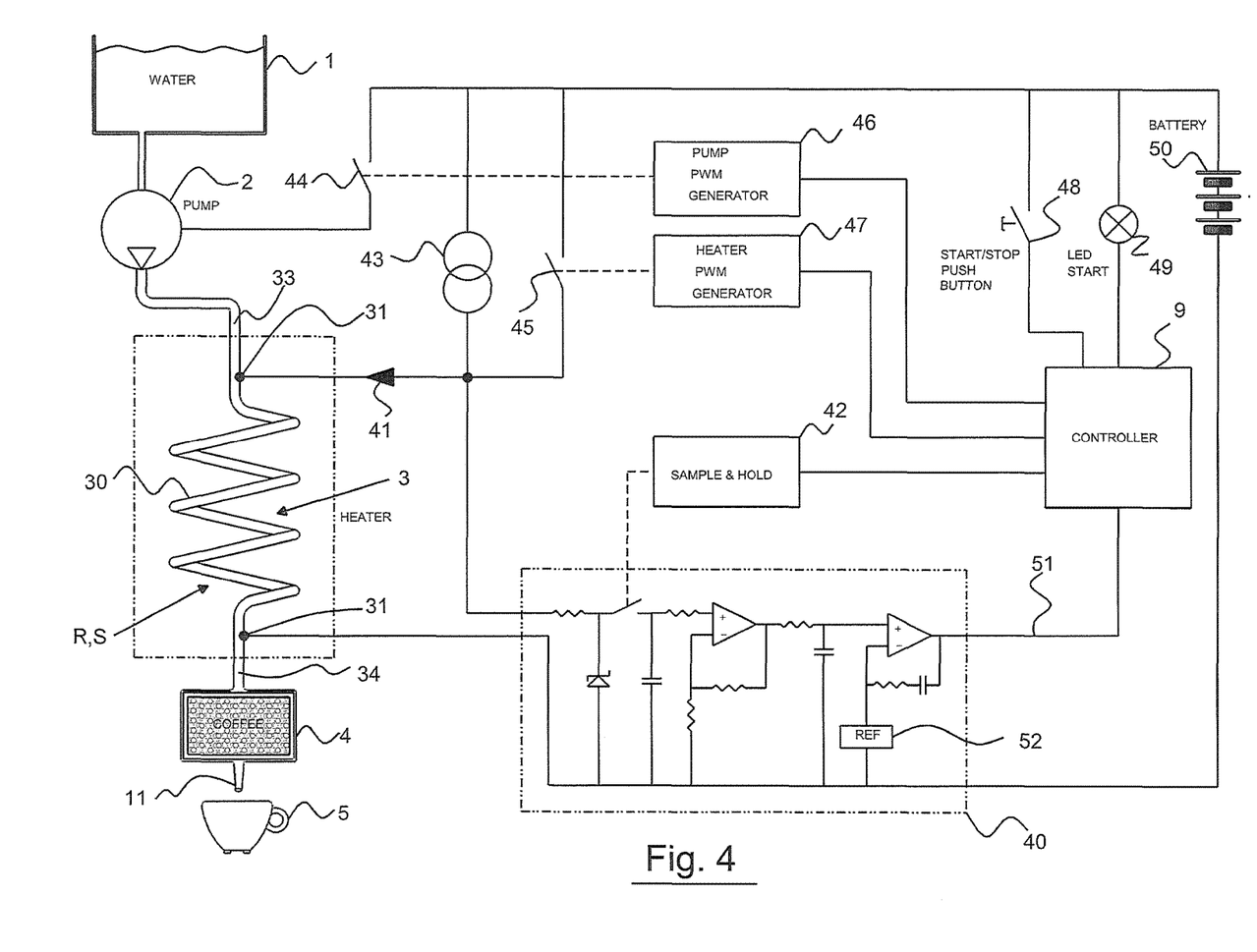
FIG. 4 is an overall schematic representation of a first embodiment of the machine according to the present invention.
Figure 4A:
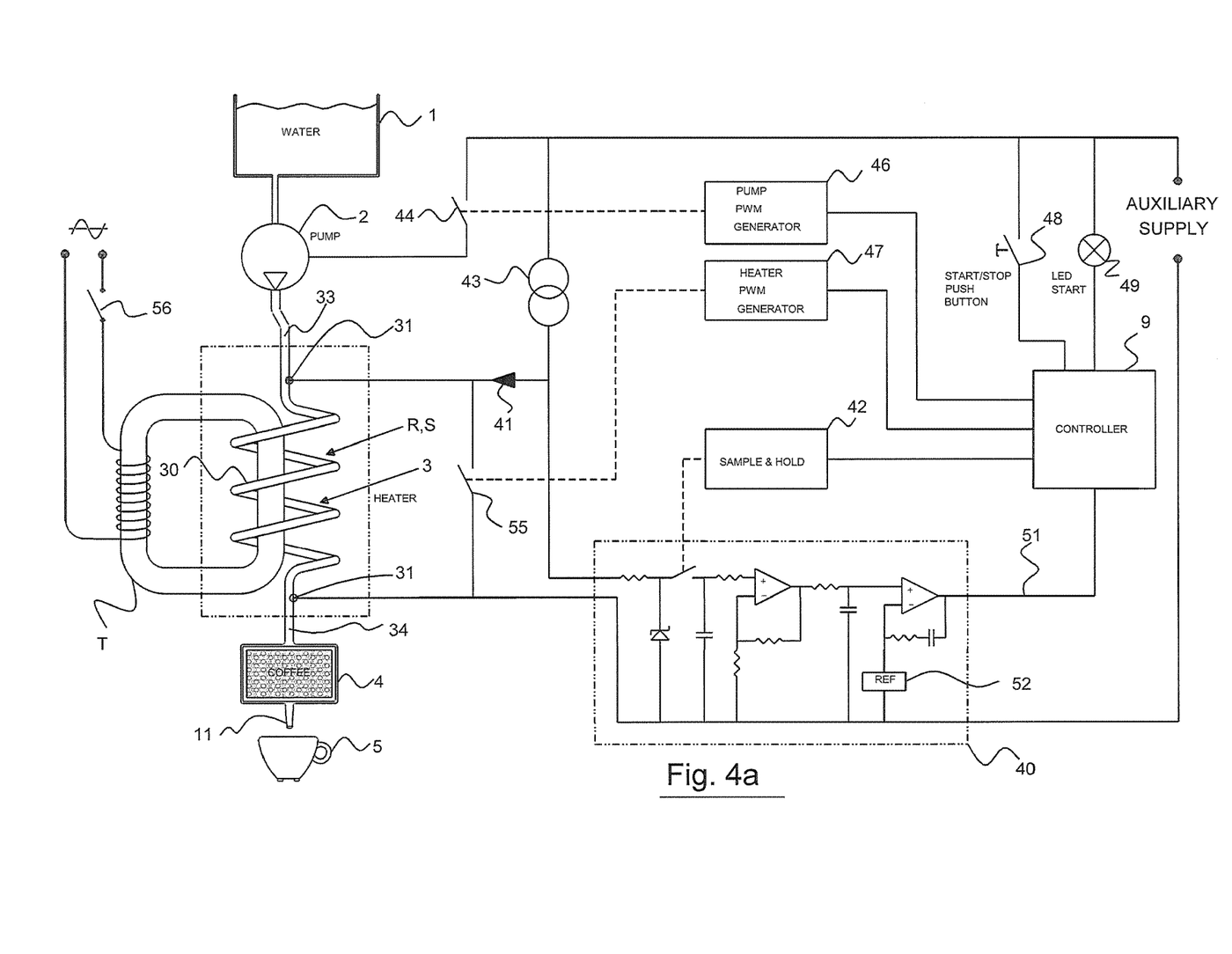
FIG. 4A is an overall schematic representation of a second embodiment of the machine according to the present invention.
Figure 5A:
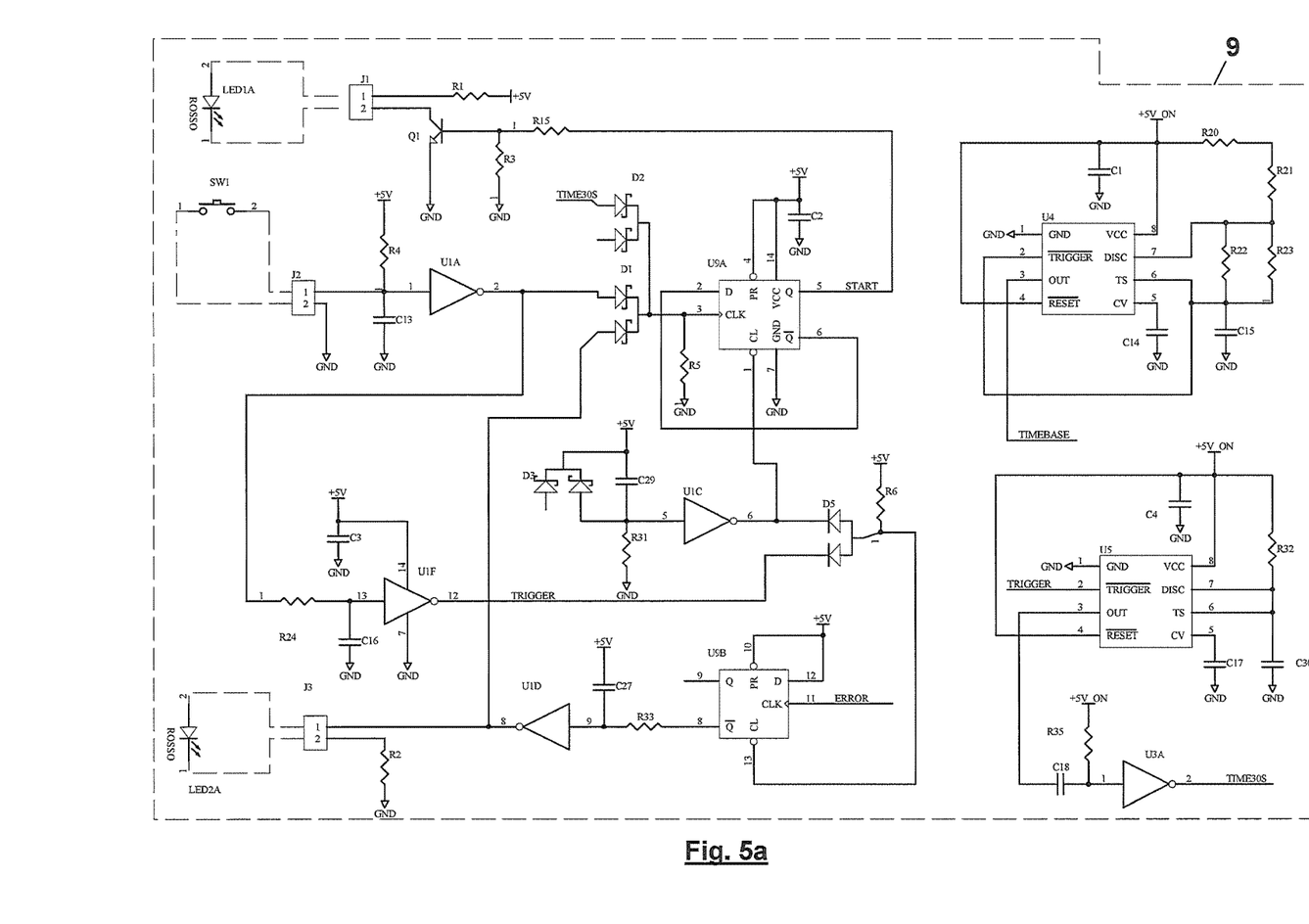
FIGS. 5A, 5B, 5C, and 5D are the complete electronic circuit diagrams of the machine appearing in FIG. 4.
Figure 5B:
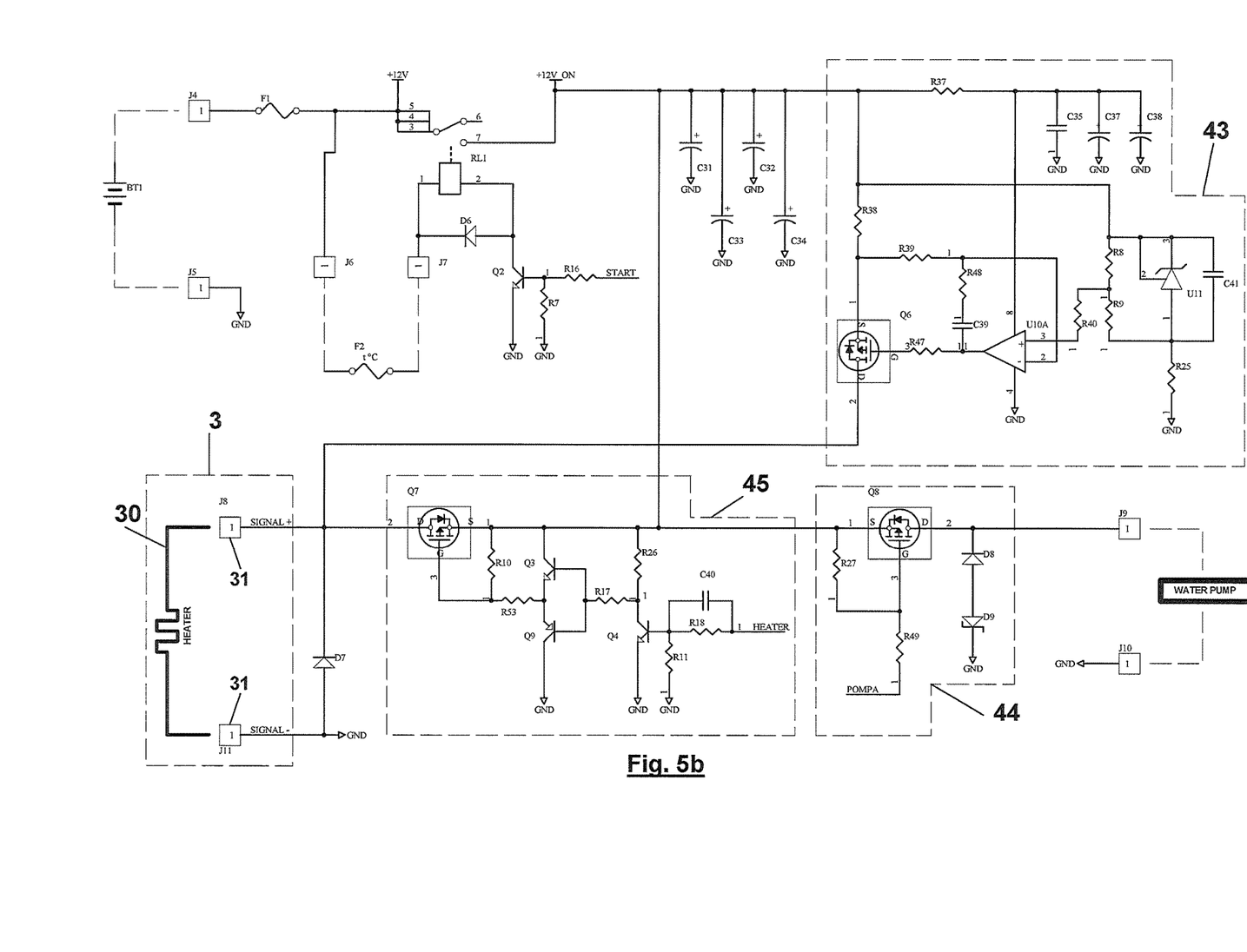
Figure 5C:
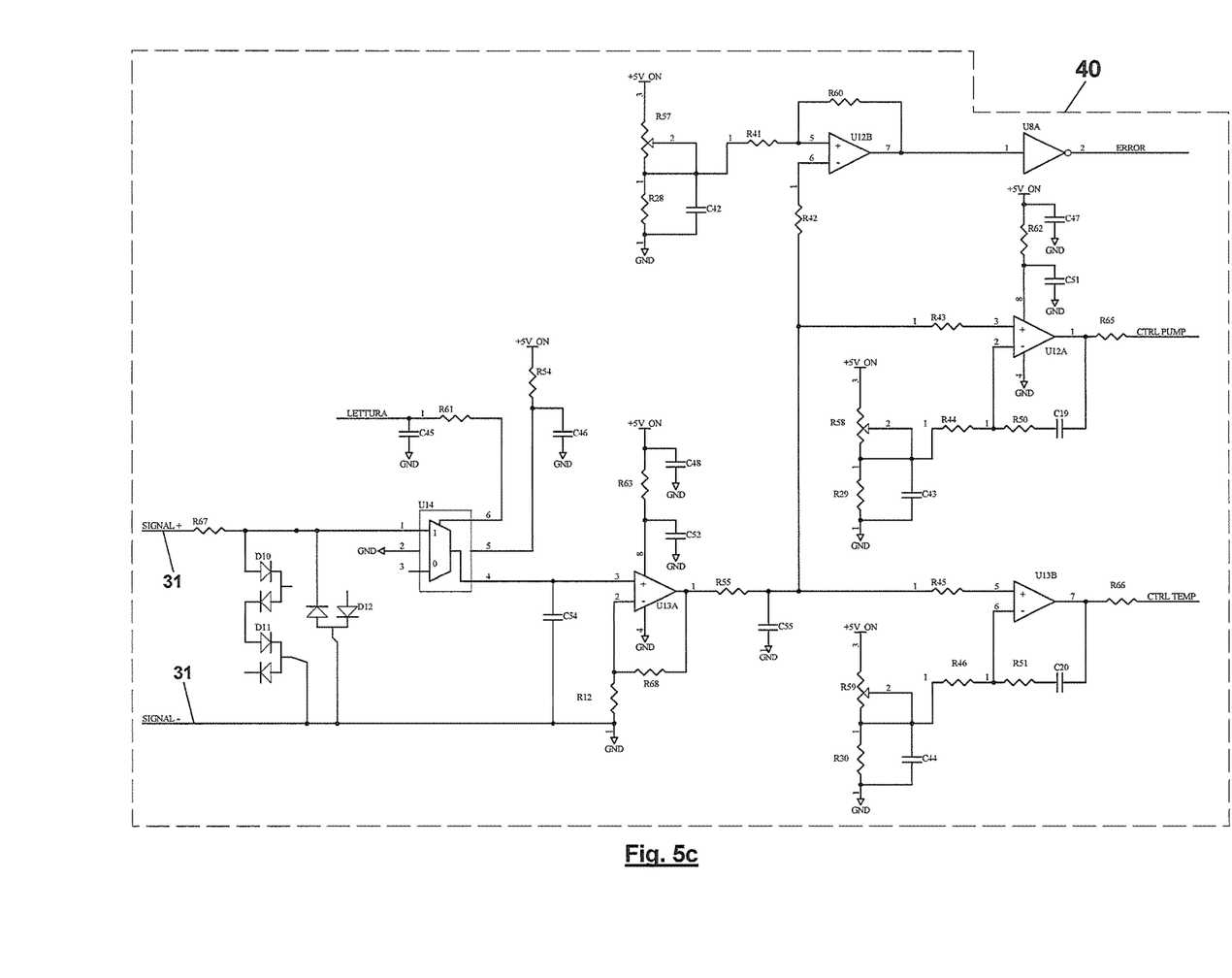
Figure 5D:
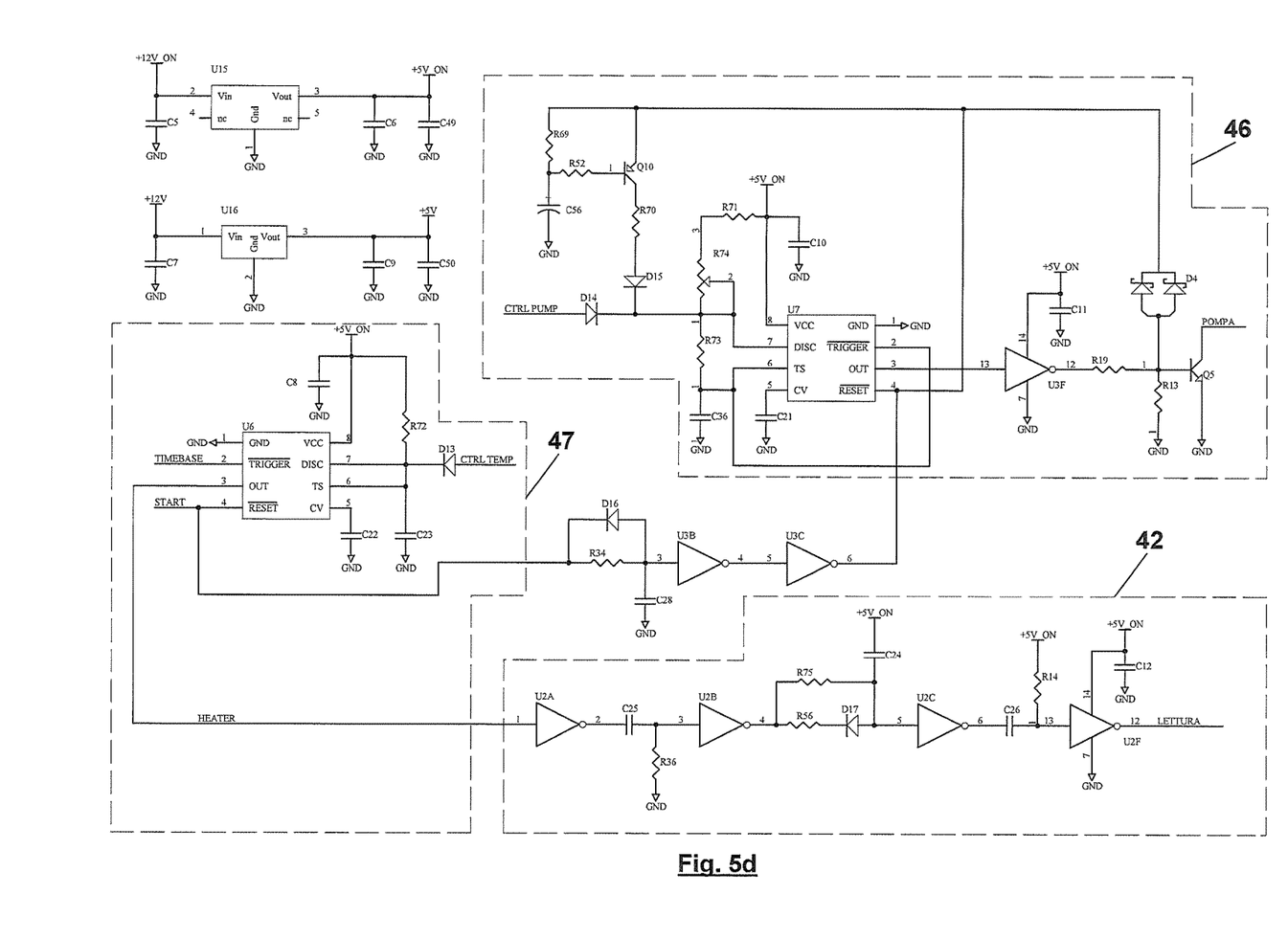

In a further embodiment, suitable for operating in connection with the electric power supply network, the tube (30) is arranged so as to form the secondary winding of a transformer (T) (FIGS. 3D and 4A). The primary winding of the transformer (T) is instead predisposed for connection to the electric power supply network or to a high frequency generator (inverter), which is, in turn, connected to the electric power supply network. In this second case, the transformer (T) will be smaller and lighter in weight. The utilisation of a transformer (T) makes it possible to lower the voltage at the ends (31) of the tube (30) to a desired value, keeping the supply voltage available for the electric power supply network.

Another embodiment suitable for operation with the mains voltage is illustrated in FIG. 3B. In this embodiment, the tube (30) is thin-walled, made of a ceramic material or the like, that is electrically insulating, but heat conductive, or of a metal material sheathed with a thin layer of electrically insulating material. The heating means (R) for heating the tube (30) comprises an electrical conductor (32) that is wound around the tube, or molded by a process of deposition around the tube. By passing the current between the ends (31) of the electrical conductor (32), the conductor (32) is heated and thus the tube (30) and the water therein. In this case as well, the resistance of the electrical conductor (32) may vary with the temperature and can therefore be used to measure the temperature of the water as in the case of the tube (30). As an alternative, for measuring the temperature of the water, the tube (30) can be used, as in the example embodiment appearing in FIG. 3A. The electrical conductor (32), also by virtue of the fact that it can be wound or molded, is provided with higher resistance and thus it is suited to operation with connection to the electric power supply network (110-230 V). The electrical conductor (32) can be deposited on the tube (30) using a serigraphic deposition method (thick film). The deposition can take place using known techniques that are equivalent in terms of the operating functionality, such as sputtering (cathode sputtering), electrolysis, and chemical or electrochemical deposition.

A further embodiment provides that the heating means (R) comprise the electrical conductor (32), while the temperature sensor (S) comprises the tube (30).

As mentioned previously, in all the embodiments described hereinabove, the temperature sensor (S) is actually a proportional temperature measurement device. Examples of proportional temperature measurement devices consist for example of thermistors, integrated circuit temperature sensors, diodes, transistors, thermoresistors and thermocouples or other equivalent devices. The temperature sensor (S) could also take on the form of a maximum temperature sensor, which is present in all machines in order to disconnect the power supply when a maximum safety temperature is exceeded; it is connected to a circuit with two temperature settings, a lower setting for water temperature control and a higher setting for machine safety.

In the embodiment illustrated in FIG. 4, the machine is powered by a battery (50). The machine comprises a control block or controller (9). The controller (9) is predisposed for controlling a first current regulator (47). The first current regulator (47) is predisposed for delivering a controlled current in a precise manner to the heating means (R). A preferred example of a current regulator (47) provides for regulating the current in a proportional manner by means of the PWM (pulse width modulation) technique. Accurate control of the current delivered to the heating means (R) is important for maintaining a constant water temperature. In the embodiment illustrated in FIG. 4, the heating means is constituted by the tube (30), to which the current produced by the first regulator (47) is supplied.

The controller (9) is also predisposed for controlling a current generator (43). The current generator (43) is predisposed for delivering a measuring current to the temperature sensor (S). In the embodiment illustrated in FIG. 4, the temperature sensor is constituted by the tube (30), to which the current produced by the second generator (43) is supplied. As mentioned previously, the resistance of the tube (30) is a function of the temperature of the tube, and thus of the water passing through it. The current generator (43) converts the variation in resistance to a voltage proportional to the temperature.

A processing block (40) is predisposed for measuring the voltage present at the terminals of the temperature sensor (S), in this case, the tube (30), when only the measuring current produced by the generator (43) is passing through it. The processing block (40) further provides for amplifying and filtering the voltage measured, which is proportional to the temperature of the tube (30), comparing it with a known reference voltage (52). The processing block (40) generates an error signal (51), which is sent to the controller (9). The error signal (51) contains information on the instantaneous temperature error at the temperature sensor (S), that is, the tube (30) in FIG. 4. Based on the error signal (51) received, the controller (9) commands the first current regulator (47) so that a certain current is sent to the heating means (R) so as to bring the temperature measured by the temperature sensor (S), that is, the tube (30), to the desired value. The first current regulator (47) translates the command received by the controller (9) into an on/off ratio of a first switch (45) interposed between the battery (50) and the heating means (R), in this case, the tube (30). The water temperature is thus regulated in a proportional manner many times per second, as needed so as to maintain the temperature stable under all operating conditions of the machine, from dispensing of the coffee to the absence of water in the heater (3).

A sampling block (42) is predisposed for synchronising measurement of the resistance of the temperature sensor (S), in this case, the tube (30), at the times in which only the measuring current of the generator (43) is sent to the temperature sensor (S), that is, at the times in which the first switch (45) is open.

A second current regulator (46) is predisposed for regulating the power applied to a water supply pump (2), for the purpose of ensuring under all circumstances an optimal flow rate of the water for making the coffee. The coffee blend that has been placed in a container (4), is sprayed with water at the proper temperature. The coffee can be dispensed in a cup (5) through a spout (11). The utilisation of a heater (3) of extremely reduced dimensions, substantially limited to dimensions of the tube (30), enables the machine to perform water temperature control in real time. This means that the flow of water does not necessarily have to remain constant as in machines of a known type, but that it can vary over time, and particularly during the process of dispensing the coffee. It is therefore possible, for example, to send a first jet of hot water to the blend and interrupt the flow for several seconds so as to keep the blend in a state of infusion. The flow then resumes so as to dispense the coffee. Essentially, in the machine according to the present invention, the flow rate of the water that is heated varies over time according to a pattern predetermined as desired.

As mentioned previously, in the embodiment appearing in FIG. 4, the machine is powered by a battery (50). The starting and stopping of the dispensing of the coffee are established by the user by means of a start/stop push button (48). Starting from an initial stop condition of the machine, in which all circuits are stand by and the current absorbed by the battery is null, pressing the start/stop push button (48) closes the first switch (45) and determines the heating of the water by means of the current sent by the first regulator (47) to the tube (30). The pump (2) supplies water to the tube (30), drawing it from a tank (1). The operation does not change in the case in which the heating means comprises the resistor (32) shown in FIG. 3B.

The current sent to the tube (30), or to the resistor (32), is regulated in a proportional manner by means of the PWM (pulse width modulation) technique, by the first regulator (47), so as to maintain a constant water temperature. The current generator (43) supplies a current of a pre-established value to the tube (30), the resistance of which is a function of the temperature of the tube (30) and thus of the water flowing through it. The processing block (40) measures the voltage supplied to the ends (31) of the tube (30) or of the resistor (32), when the heating current is not passing through them (switch 45 open), but only the measuring current sent by the generator (43) is passing through them. The processing block (40) provides for amplifying and filtering the signal proportional to the temperature, comparing it with a known reference voltage (52) and generating the error signal (51). The error signal (51), which contains the information on the instantaneous temperature error, is sent to the controller (9) and to the first regulator (47), which translates it into an on/off ratio of the first switch (45). The water temperature is therefore regulated in a proportional manner many times per second, as needed so as to maintain the temperature stable under all operating conditions of the machine, from dispensing of the coffee to the absence of water in the heater. The sampling block (42) synchronises measurement of the resistance of the tube (30), or of the resistor (32) at the times in which the first switch (45) is open. The second current regulator (46) instead regulates the power applied to the pump (2), so as to ensure under all circumstances the optimal flow rate of water for making the coffee.

By pressing the start push button (48) again, the user stops the dispensing of coffee at the desired level and all the machine circuits switch off, bringing absorption back to zero again.

An indicator led (49) can be utilised to inform the user of proper dispensing of the coffee, for example by staying continuously lit. In the case of malfunctioning (lack of water, low battery, etc.), the led will blink in order to signal that the coffee is not being dispensed.

Note that, given that they are known to a person skilled in the field, all the auxiliary and safety circuits have been omitted for the sake of providing a clear exposition.

Note also that the operation of the machine is the same in all of the illustrated embodiments, that is, considering the resistor (32) in place of the tube (30) as the heating means, and the resistor (32) or other proportional temperature measurement device (8) in place of the tube (30). FIG. 3c shows an embodiment of the invention in which the tube (30) is made of PTC (positive temperature coefficient) ceramic material The PTC material has a markedly non-linear resistance/temperature response: upon reaching the Curie temperature, the material increases in resistance by as much as 10-fold in a 20-30° C. interval, and this makes a certain regulation of the operating temperature possible. Generally said regulation is not sufficiently precise to maintain the water temperature at 90° C. with an allowance of a few degrees, but it is useful in any case as a pre-regulation and/or safety measure in the event of malfunctioning of the control circuit (9). By changing the flow rate of the pump (2) by means of the second regulator (46), the typical temperature control of the PTC can be improved, bringing it within the required precision of a few degrees. The PTC resistance is thus utilised to regulate the flow rate of the pump (2) through the second regulator (46). In this case, the PWM current generator (43) is maintained at the maximum duty-cycle.

In all the embodiments described and illustrated herein, there is provided one or more maximum temperature sensors connected to the controller (9), which are not illustrated given that they are within the reach of a person skilled in the field. If the temperature detected by the maximum temperature sensor or sensors exceeds a predetermined threshold, the controller (9) deactivates the heating means (R).

In FIGS. 5A, 5B, 5C and 5D the complete and functional realisation of the coffee machine that is the subject matter of the present invention, is indicated in the parts of the electronic power and control circuits and for the realisation of the heater (3). The realisation of the water tank (1), the pump (2) and the container for the blend of coffee (4) are not described in detail, as they are standard components available on the market.

Instead the list of the components utilised appears in FIG. 6.

The invention claimed is:

1. A machine for making coffee or other infusions in boiling water, comprising:
   a heater (3), said heater (3) comprising a tube (30), said tube (30) being in fluid communication with an inlet (33) and an outlet (34), said tube (30) having a first end (31) and a second end (31) and being made of an electrically conductive material selected from the group consisting of electrically conductive metal material and PTC ceramic material; and
   a heating means (R) adapted for utilising an electric current for heating the tube (30), the heating means (R) comprising electrical conductors which electrically connect the first end (31) and the second end (31) to an electric power source so that, when electric power is directly provided to said first end (31) and second end (31), electric current passes through the electrically conductive material of the tube (30) between the two ends (31, 31) and effectively heats the electrically conductive material;

characterised in that the machine further comprises:
   at least one temperature sensor (S) structured in such a manner as to be at the same temperature as the tube (30) and to vary in resistance based on the temperature of the temperature sensor (S);
   a controller (9), predisposed for commanding the delivery of an electric heating current to the heating means (R) and delivery of an electric measuring current to the temperature sensor (S), wherein the electric heating current and the electric measuring current are directly provided to and flow through the walls of the tube (30);
   a processing block (40), predisposed for measuring the voltage present at terminals of the temperature sensor (S), when the electric measuring current is passing through the temperature sensor (S), and for comparing the measured voltage with a known reference voltage (52), generating an error signal (51), and for providing the error signal (51) to the controller (9);
   wherein the controller (9) is predisposed for commanding the delivery of the electric heating current to the heating means (R), said electric heating current being proportional to the error signal (51) received.

2. The coffee machine according to claim 1, wherein: the heating means (R) and the temperature sensor (S) comprise the tube (30), made of electrically conductive metal material and predisposed for having an electric current pass therein between the two ends thereof (31).

3. The coffee machine according to claim 1, wherein the electric heating current, directly applied to said first end (31) and second end (31) of said tube (30), is a pulsed DC electric current, wherein the pulsed DC electric current is regulated in a proportional manner to the error signal (51) by means of PWM (pulse width modulation) technique.

4. The coffee machine according to claim 1, wherein: the heating means (R) comprises the tube (30), which is made of metal and which is predisposed for having an electric current pass therein between two ends (31) thereof; the temperature sensor (S) comprises a proportional temperature measurement device, arranged in direct contact with the metal tube (30).

5. The coffee machine according to claim 1, wherein the heating means (R) comprises the tube (30) made of PTC ceramic material and predisposed for having an electric current pass therein between the two ends (31) thereof; the temperature sensor (S) comprises the tube (30).

6. The coffee machine according to claim 1, wherein the temperature sensor (S) comprises a maximum temperature sensor.

7. The machine according to claim 1, comprising a pump (2) associated with a second current regulator (46), connected to the control circuit (9), which regulates the flow rate of the water sent to the tube (30) based on the temperature detected by the temperature sensor (S) and/or based on a predetermined pattern over time.

8. The coffee machine according to claim 1, wherein: the heater (3), comprising the tube (30), has a thermal mass that is markedly lower than that of the liquid to be heated and the tube (30) has an electric current (41) passing though it discontinuously, between the two ends (31) thereof, so as to regulate the temperature of a flow of water, a continuous or discontinuous flow, which enters cold at a first end (33) and exits at a second end (34) at an accurately controlled temperature; the electrical resistance of the tube (30), which varies with the temperature, is measured at times in which the electric current (41) is null; said electrical resistance of the tube (30) is constantly monitored by means of the processing block (40) so as to maintain the temperature of the water exiting at the predetermined temperature by means of the controller (9), which controls a first current regulator (47), which, in turn, activates a first switch (45), which regulates the electric current (41).

9. The machine according to claim 8, wherein the measurement of the temperature of the hot water at the second end (34) is obtained by means of a temperature sensor (S), placed in close thermal contact with a part of the tube (30) near the second end (34).

10. The machine according to claim 8, comprising an over temperature sensor also used for measuring the temperature of the water at the second end (34).

11. The machine according to claim 8, characterised in that for measurement of the water temperature, the machine utilises the electrical resistance of the tube (30), said measurement being carried out by directly assessing the ratio between voltage applied to the tube (30) and the electric current (41) flowing in the tube (30).

12. The machine according to claim 1, wherein the flow rate of the water that is heated, varies over time according to a predetermined pattern.

13. The machine according to claim 1, wherein the tube (30) is made of electrically conductive metal material.

14. The machine according to claim 1, wherein the tube (30) is made of electrically conductive PTC ceramic material.

* * * * *